Patented Aug. 5, 1952

2,605,554

UNITED STATES PATENT OFFICE 2,605,554

PROCESS FOR THE DESICCATION OF LABILE AQUEOUS MATERIALS

Earl W. Flosdorf, Forest Grove, Pa., assignor to Lyophile-Cryochem Corporation, Baltimore, Md., a corporation of Maryland No Drawing. Application August 5, 1947, Serial No. 766,475

1 Claim. (Cl. 34—1)

This invention relates to improvements in the desiccation of aqueous materials from the frozen state, and more particularly to improvements by which the rate of desiccation may be materially increased by increase of the rate at which the last portions of the water present in the aqueous material are removed.

Desiccation of various materials, such as biologicals, foodstuffs and labile chemicals are known. In general, they involve freezing the material and subliming the ice therefrom by the application of a high vacuum until substantially all of the water is removed therefrom, such that the product has a moisture content which may range from about .5 to about 25%, and subsequently raising the temperature of the material to room temperature or even to higher temperatures such as 50 or 60° C. to remove the last traces of the water and to reduce the water content of the material to the lower level required for stability on storage, nearly always below 2%, usually 1% or 0.5% or less.

The process is carried out at a very low pressure or high vacuum, usually of the order of 50 to 700 microns, although certain materials, under certain conditions, may be desiccated at higher pressures, for example, 2 to 3 mm. The requirement as to pressure is that it be sufficiently low, below the vapor tension of the frozen material, so that the frozen water sublimes at a rate sufficiently high to keep the material frozen, or at least in a congealed, i. e., plastic, state.

In carrying out this operation, it is necessary that the latent heat of sublimation of the water be supplied. In most of the operations used today, the process is carried out by placing the material to be dried in a vacuum chamber provided with means for heating it such as heated shelves, heating jackets, or both, radiant heaters, or the like. In the application of Samuel Bradbury, 3rd, Serial No. 655,588, filed March 19, 1946 now Patent No. 2,513,991 the use of a high frequency electric field for generating the required heat is described. In general, because the means for removing the water vapor which have been developed and used and are available have a capacity adequate to remove the water vapor faster than it can be generated the essential limitation on the speed of the drying operation during the time when ice is present in the material to be desiccated is essentially limited to the rate at which it is possible to supply heat to the frozen material without either (1) causing any part of it to liquefy, or (2) overheating any portion of it which may be dried.

In many normal operations, involving the desiccation of a wide range of biologicals and other materials, it has been found that it is necessary, to insure the proper low moisture content of the final product, to continue the application of the high vacuum for a substantial period of time after the temperature of the frozen material rises above 0° C., representing the point at which the ice has all been sublimed and the cooling effect of the sublimation is insufficient to keep the temperature of the material down, without any increase in the rate at which heat is supplied by the heating medium.

The present invention provides improvements which radically shorten the time period required to remove the water which remains in the product undergoing desiccation after the ice has been sublimed and what is required is the removal of the residual water. In accordance with the present invention the initial removal of water, that is, the sublimation of the ice, is carried out in the usual way with the material in trays or other containers in a vacuum chamber and with the heat being supplied by circulating a heating medium through the jacket of the chamber and its shelves, or by electrically heating the shelves, by radiant heating or in other ways, and after the ice has been sublimed and the temperature of the material rises to about 0° or is rising to 0°, further heat is supplied by subjecting the material to a high frequency electric field, which causes the generation of heat within the material itself, and radically increases the rate at which the last portions of water are evaporated.

In the process of the present application, the amount of heat required to be supplied dielectrically is merely that required to cause the evaporation of the water remaining after the sublimation of ice is finished, corresponding to the heat of evaporation of from 5 to 25% of water based on the final solids, that is, approximately ½₀th to ¼ pound of water per pound of dry solid.

In addition to the fact that when operating in accordance with the present invention most of the heat is supplied by inexpensive sources of heat such as circulating hot water or steam or the like and only a small proportion of the required heat is supplied dielectrically, the present invention has the advantage that the electric field may operate at a much lower frequency than it is possible to operate in the process of the Bradbury application. Thus, that application points out that during the desiccation operation when ice is present it is necessary to have a vacuum sufficiently high to cause the sublimation to proceed at a rate which, despite the supply of heat, keeps the material cold enough to prevent it from liquefying, i. e., a vacuum of the order of 50 to 750 microns. At such low pressures, high frequencies in excess of 200 megacycles are required to prevent ionization or arcing within the vacuum chamber. In contrast with this, in the practice of the present invention the electric field is not used in that part of the operation where sublimation of ice occurs and where it is necessary to keep the temperature of the material at a low level by balancing the rate of heat input and the rate of sublimation with its concomitant requirement of a relatively high vacuum within the vacuum chamber. In the practice of the present process, dielectric heating is not used until the ice has been sublimed and the temperature of the material may be raised above 0° C. without damage to it. Consequently in the practice of this process the pressure within the vacuum chamber may be considerably elevated at the stage of the operation at which dielectric heating is used with the result that arcing and ionization are inhibited and much lower frequencies, for example, from 10 to 20 megacycles may be used. This is advantageous from the standpoint of availability of oscillating tubes suitable for use in supplying the necessary power. Thus, the pressures maintained in the vacuum chamber during the period that the dielectric field is used for supplying heat may be of the order of 2″ to 3″ of mercury, as distinguished from the much higher vacuums used in the initial stages of the operation when ice is present and it is necessary to prevent its liquefaction by insuring an adequately rapid sublimation.

The process may be carried out in any convenient apparatus, and requires little modification of the apparatus which is currently used. One type which is more or less widely used consists of a large chamber capable of being sealed with a vacuum tight seal and provided with a large outlet leading to a cold condenser and thence to a vacuum pump. The vacuum chamber is provided with shelves and the material to be desiccated may either be placed in trays on the shelves, or in glass or other containers and then be placed on the shelves. The material is frozen in the trays or containers either before placing them in the chamber or after placing them in the chamber and by the use of a refrigerant or by autorefrigeration induced by the application of an appropriate vacuum, all as is well known to those skilled in the art. When the frozen material is in place the vacuum chamber is closed and the vacuum pump is started. The vacuum pump removes the permanent gases from the system and the water vapor which is generated is condensed on the cold condenser which, of course, is maintained at a temperature lower than that of the frozen material to be desiccated. To modify this well known apparatus for practicing the present invention merely requires the placing of plates within the chamber, insulated from each other, in such position that the frozen material is between them, the plates being connected to a suitable source of high frequency current. Upon supplying the high frequency current to these plates the high frequency electric field which serves to generate the heat within the material as directed above is established.

The operation, in its initial stages then proceeds in accordance with the usual practice, the heat required being supplied by circulating a heating medium through the shelves, heating them electrically, by radiant heat or in other ways. At that stage of the operation at which the ice is all sublimed, which is readily determined by the marked upturn in the temperature of the material undergoing desiccation as traced by suitably positioned thermocouples or the like, and about the time when the temperature of the material rises above its freezing point, the high frequency electric field is turned on, causing generation of heat within the material itself to rapidly remove the small proportion of water which is still present. The only heat generated by the high frequency electric field is in those portions of the material which still contain some water. No heat is generated in any portions which may be dry. The possibility of overheating the material is therefore substantially avoided because no portion will be heated hotter than that temperature at which the vapor pressure of the water present corresponds to the pressure within the chamber. As soon as the water is substantially removed the heating effect at that part of the material ceases. In this way, instead of requiring a long period of time to insure the removal of the last portions of water down to the required low content required, which has frequently been from 12 to 36 hours or more, depending upon the particular material being dried and the quantity being dried, the last portions of water may be adequately removed within a period of a few minutes up to 2 or 3 hours, permitting a radical increase in the capacity of the apparatus. Unless an extremely high frequency electric field, such, for example, as one operating above 200 megacycles is used, it is necessary to increase the pressure in the chamber at the time the electric field is turned on to prevent ionization and arcing. Thus, if the field has a frequency about 10 to 20 megacycles the pressure may be increased to about 2″ or 3″ of mercury. At this pressure the material will rapidly dry when its temperature is raised by the dielectric heat generated without bringing the temperature of the material being dried to an excessive level.

I claim:

In the process of desiccating labile aqueous materials by removal of water therefrom by the application of high vacuum to the material after freezing it, the steps of supplying latent heating of sublimation to the material while ice is present by external heating means, and subsequently supplying heat to the material, after all of the ice has been sublimed, by dielectric heating by subjecting it to a high frequency electric field, raising its temperature above 0° C. and facilitating the removal of the remaining water.

EARL W. FLOSDORF.

(References on following page)

REFERENCES CITED

The following references are of record in the file of this patent:

UNITED STATES PATENTS

| Number | Name | Date |
|---|---|---|
| 2,292,447 | Irwin | Aug. 11, 1942 |
| 2,307,802 | Reichel | Jan. 12, 1943 |
| 2,353,986 | Barr | July 18, 1944 |
| 2,396,561 | Flosdorf | Mar. 12, 1946 |
| 2,427,786 | Hoyler | Sept. 23, 1947 |
| 2,442,114 | Brown | May 25, 1948 |
| 2,454,370 | Bearbien | Nov. 23, 1948 |

OTHER REFERENCES

"Drying and Laminating by Radio Frequency," by George F. Russell, The Timberman, August 1944, pages 38 to 42.

"All-Electronic Penicillin Drying System," Chemical and Engineering News, p. 1450, No. 16, vol. 23, Aug. 25, 1945.

"Radio-Frequency Dehydration of Penicillin Solution," by Brown et al., reprinted Feb. 1946, RCA Laboratories, Radio Corporation of America.

"The Chemical Age," article by G. Colman Green, Feb. 9, 1946, pages 157–161.